United States Patent [19]

Uchimura et al.

[11] Patent Number: 4,693,330

[45] Date of Patent: Sep. 15, 1987

[54] LOAD CELL SCALES

[75] Inventors: Mitsuo Uchimura; Tsutomu Masuyama, both of Numazu, Japan

[73] Assignee: Tokyo Electric Co., Ltd., Tokyo, Japan

[21] Appl. No.: 858,951

[22] Filed: May 2, 1986

[30] Foreign Application Priority Data

May 15, 1985 [JP] Japan .................. 60-103530

[51] Int. Cl.⁴ .................. G01G 19/40; G01G 19/52; G01G 23/14

[52] U.S. Cl. .................. 177/25; 177/50; 177/164

[58] Field of Search .................. 177/50, 164, 25.14

[56] References Cited

U.S. PATENT DOCUMENTS

| | | | |
|---|---|---|---|
| 4,037,675 | 7/1977 | Storace et al. | 177/229 |
| 4,310,893 | 1/1982 | Loshbough | 177/50 X |
| 4,313,509 | 2/1982 | Engels | 177/50 |
| 4,535,857 | 8/1985 | Haze | 177/164 X |
| 4,545,445 | 10/1985 | Naito | 177/164 X |

*Primary Examiner*—George H. Miller, Jr.

*Attorney, Agent, or Firm*—Frishauf, Holtz, Goodman & Woodward

[57] ABSTRACT

A load cell scale includes a memory for storing span data, a weight data generating circuit for generating weight data corresponding to load weight, and a data processing unit for generating weighing data on the basis of the weight data and span data. The scale further includes first and second keys, and a nonvolatile memory having first and second memory areas. The data processing unit responds to the operation of the first key to store, as zero-point data, the weight data from the weight data generating circuit, into the first memory area of the nonvolatile memory. The data processing unit further responds to the operation of the second key to store, into the second memory area of the nonvolatile memory, the difference between the zero-point data and the weight data from the weight data generating circuit. The difference data is used as span data. The data processing unit divides a preset value by the span data, obtaining a value, and multiplies the quotient by the weight data from the weight data generating circuit. The weight data resulting from the multiplication is output as weighing data.

9 Claims, 4 Drawing Figures

LOAD CELL SCALES

BACKGROUND OF THE INVENTION

This invention relates to load cell scales.

In earlier load cell scales, it was necessary, at the manufacturing stage, to set the zero point and span to design values. To this end, the variable resistor provided inside of the load cell was manually adjusted by an operator, while watching the CRT screen displaying waveforms or numerals of the output voltage of the load cell. For this reason, the setting of the zero point and span required much time and labor.

In multi-load cell scales, which each comprise a plurality of load cells, much time and labor were consumed to set the zero point and span of every load cell to the design values.

SUMMARY OF THE INVENTION

An object of this invention is to provide a load cell scale which can readily set the data necessary for weighing an object, such as the zero point and span.

To achieve the above object, there is provided a load cell scale comprising: weight data generator for generating weight data corresponding to load weight; first and second keys; a memory having first and second memory areas; and data processing unit for storing in response to the operation of the first key the weight data from the weight data generator, as zero-point data (W0), into the first memory area of the memory, for storing in response to the operation of the second key a difference between the zero-point data (W0) and the weight data from the weight data generator into the second memory area of the memory as span data (WS), and for producing the weight data resulting from multiplication of the weight data (WL) from the weight data generator by a value (WR/WS) as obtained by dividing a rated value (WR) by the span data (WS).

According to this invention, the weight data corresponding to load weight can be obtained, without correcting the zero-point data and span data formed from the weight data generated from the weight data generator.

DETAILED DESCRIPTION OF THE PREFERRED EMBODIMENTS

Figure 1:
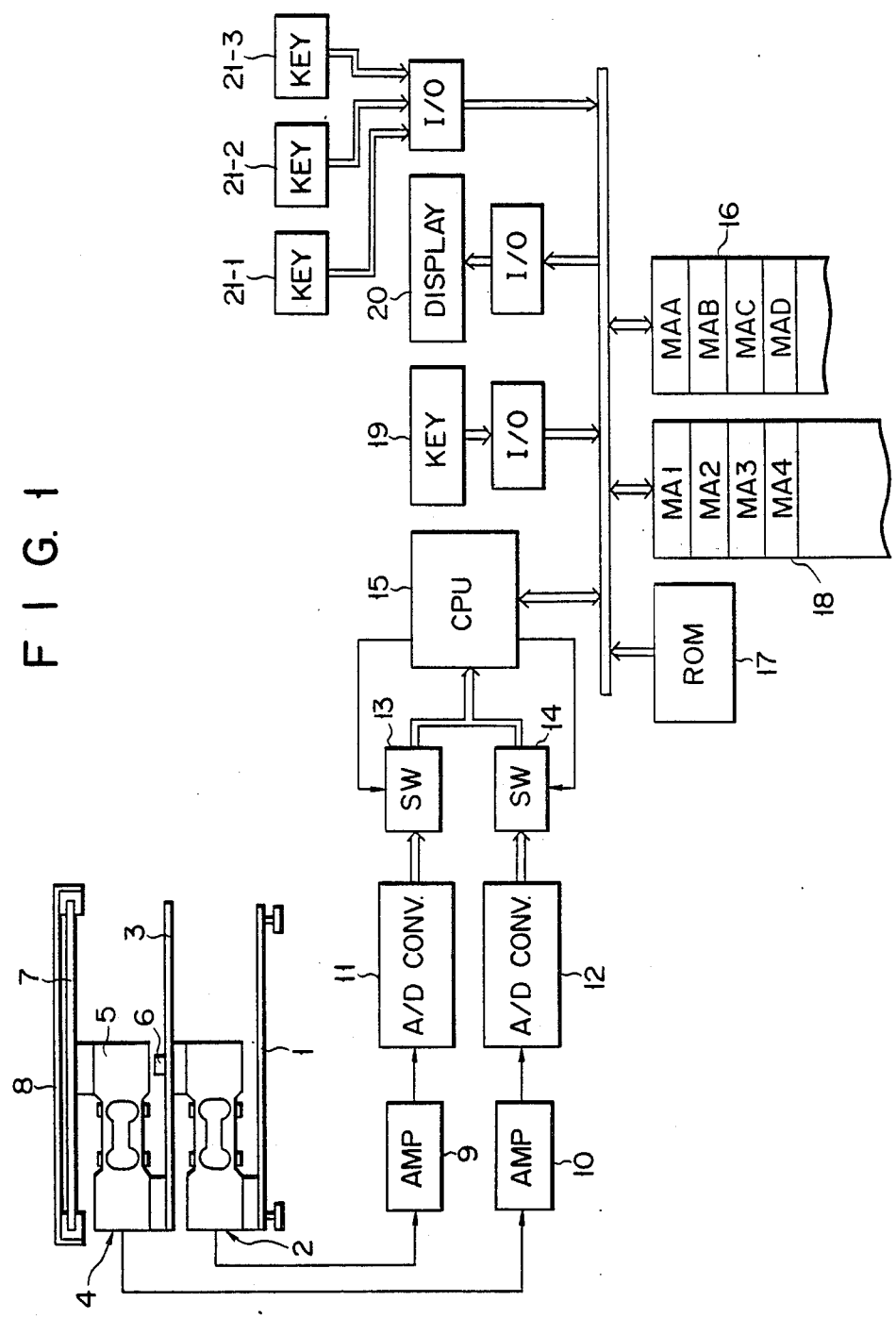
FIG. 1 shows, in schematic and block form, a configuration of a multi-load cell scale according to an embodiment of this invention.

A preferred embodiment of this invention will be described referring to FIG. 1. The mounting fitting for heavy-weight measuring or heavy-range load cell 2 is fixed to the top of base plate 1. Middle frame 3 is mounted on the free end of this low-sensitivity, heavy-range load cell 2. The mounting fitting for the high-sensitivity, light weight measuring or light-range load cell 4 is affixed to the top of middle frame 3. Stopper 6 is also affixed affixed to the top of the middle frame, below the free end of the light-range load cell, and limits excessive distortion of load cell 4. For example, if load weight of 2.7 Kg is applied to the scale, the free end of load cell 4 comes in contact with stopper 6, to prevent any further distortion of load cell 4. Frame 7 is coupled with light-range load cell 4. Plate 8 is placed on frame 7.

Load cells 2 and 4 are coupled with CPU 15 through amplifiers 9 and 10, A/D converters 11 and 12, and load cell output selectors 13 and 14. CPU 15 is connected to nonvolatile memory 16, ROM 17, RAM 18, coefficient key 19, display device 20 and test keys 21-1 to 21-3. ROM 17 stores programs to be executed by CPU 15. RAM 18 temporarily stores the operation results from CPU 15. Nonvolatile memory 16 stores zero-point data representing the characteristics of load cells 4 and 5, and characteristic data such as span data.

When load weights of 2.5 Kg and 30 Kg are applied to load cells, respectively, and if these produce the same rated output voltages, then A/D converters 11 and 12 produce digital data of the same count.

Coefficient key 19 has been set at "X", "Y" or "Z" position according to the coefficient of the acceleration of gravity in the area where the load cell scale is actually used. Therefore, if the same balance weight is used, this scale will display the same weight data, regardless of the area where it is used.

The setting operation of the zero point and span of the multi-load cell scale will be given referring to the flow chart shown in FIG. 2. In non-load state, when first test key 21-1 is operated, switch 13 is closed, storing weighing amount based on the output from load cell 2, as zero point data WX0, in the memory area MAA of memory 16. When the rated load of load cell 2, for example, a balance weight of 30 Kg, is placed on plate 6, and then second test key 21-2 is operated, an output signal is generated from load cell 2 and the weight data WX1 representing 30 Kg is obtained based on the output signal. The data obtained by subtracting the zero point data WX0 from the weight data WX1, becomes span data WXS (=WX1−WX0), and is stored in the memory area MAC of memory 16. Since, in this embodiment, the rated weight is set at 30 kg, it is convenient to set the reference span count to "30000".

CPU 15 reads the weight data WXL from A/D converter 11 and writes the readout data in the memory area MA1 of RAM 18. Further, CPU 15 multiplies the weight data WXL by (30,000/WXS), and stores its product into the memory area MA3 of RAM 18. Then, CPU detects the "X", "Y" or "Z" position at which coefficient key 19 is set, multiplies the data WXR stored in the memory area MA3 by the coefficient 1, CY or CZ, dependent on the key position, and displays the data resulting from this multiplication as weight data.

Figure 3:
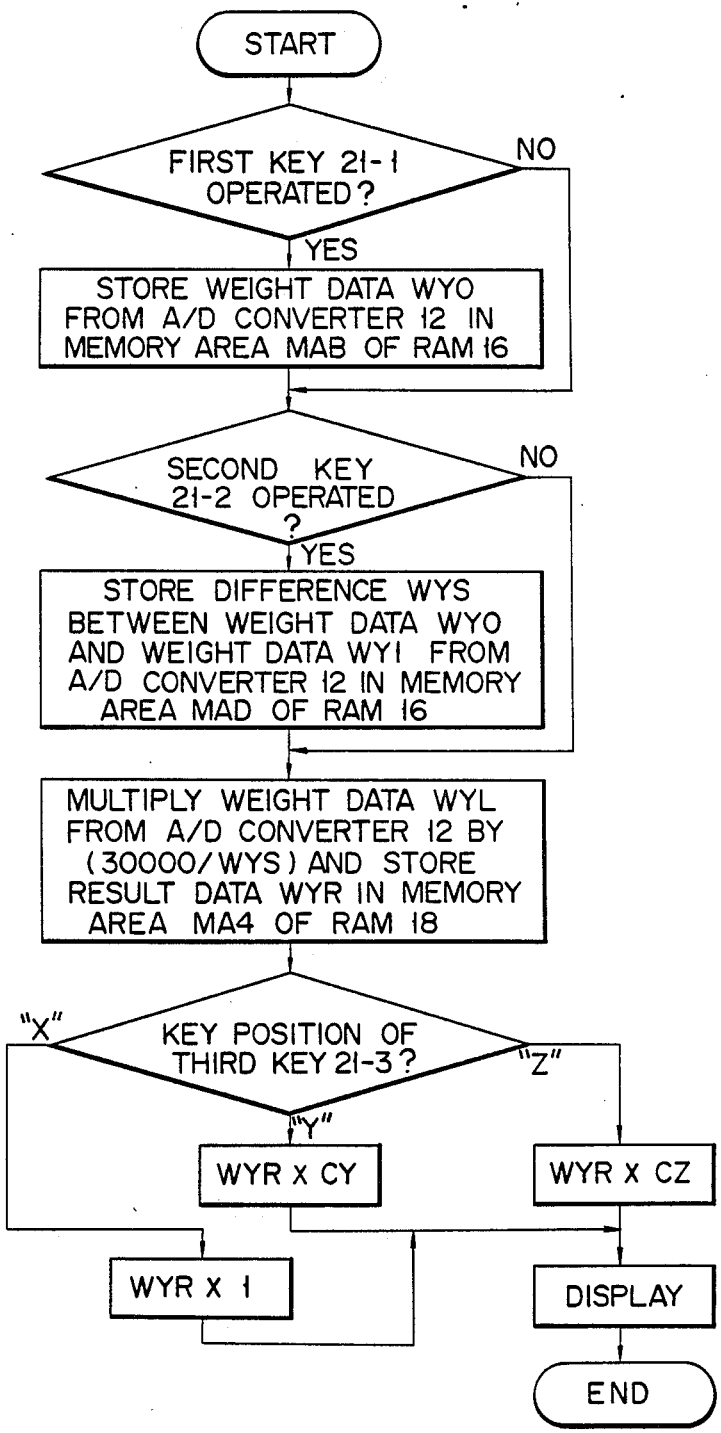

FIG. 3 shows a sequence of procedural steps for setting the zero point and span data for each load cell 4. When first key 21-1 is operated, switch 14 is closed, storing the weighing amount based on an output signal from load cell 4, as zero point data WY0, into the memory area MAB of memory 16. In the next step, the rated load of load cell 4, for example, a balance weight of 2.5 Kg, is placed on plate 6, and second test key 21-2 is operated. The data obtained by subtracting zero point data WY0 from the weighing amount based on the output from load cell 4 is stored into the memory area MAD of memory 16, as span data WYS (=WY1−−WY0).

CPU 15 reads the weight data WY1 from A/D converter 13 and stores it into the memory area MA2 of RAM 18. Then, CPU 15 multiplies weight data WYL by (30,000/WYS) to obtain data WYR (=WYL×(30000/WYS)) corresponding to the product, and writes the data WYR in memory area MA4. Subsequently, as in the previous case, the data WYR is multiplied by the coefficient 1, CY or CZ depending on the key position of coefficient key 19. The weight data resulting from the multiplication is displayed.

Figure 2:
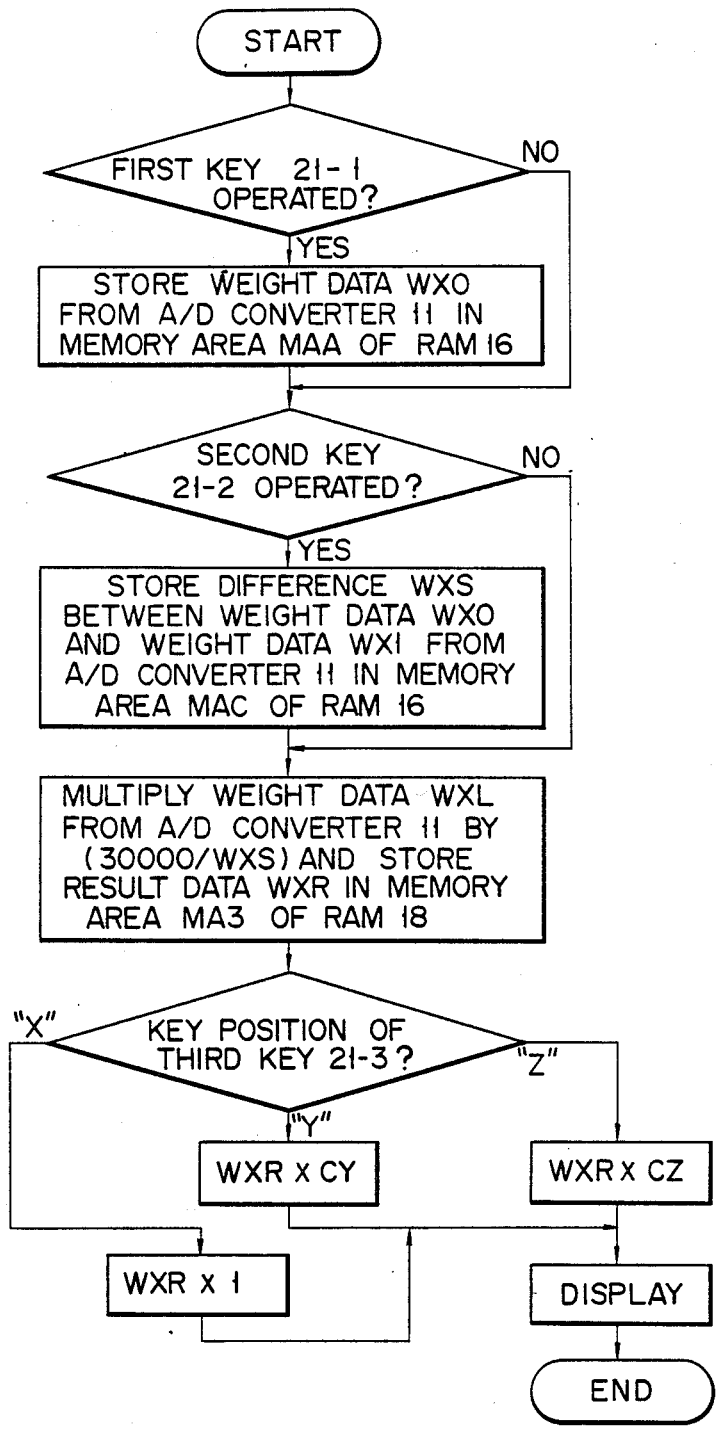
FIGS. 2 and 3 show flow charts useful in explaining the operation of the multi-load cell scale shown in FIG. 1.

In the flow charts shown in FIGS. 2 and 3, when neither first test key 21-1 nor second test key 21-2 is operated, the weight data WXL or WYL based on the output signal from load cell 2 or 3 is corrected according to span data WXS or WYS. The corrected weight data is multiplied by the coefficient 1, CY or CZ, and the product is displayed by display device 20.

Figure 4:
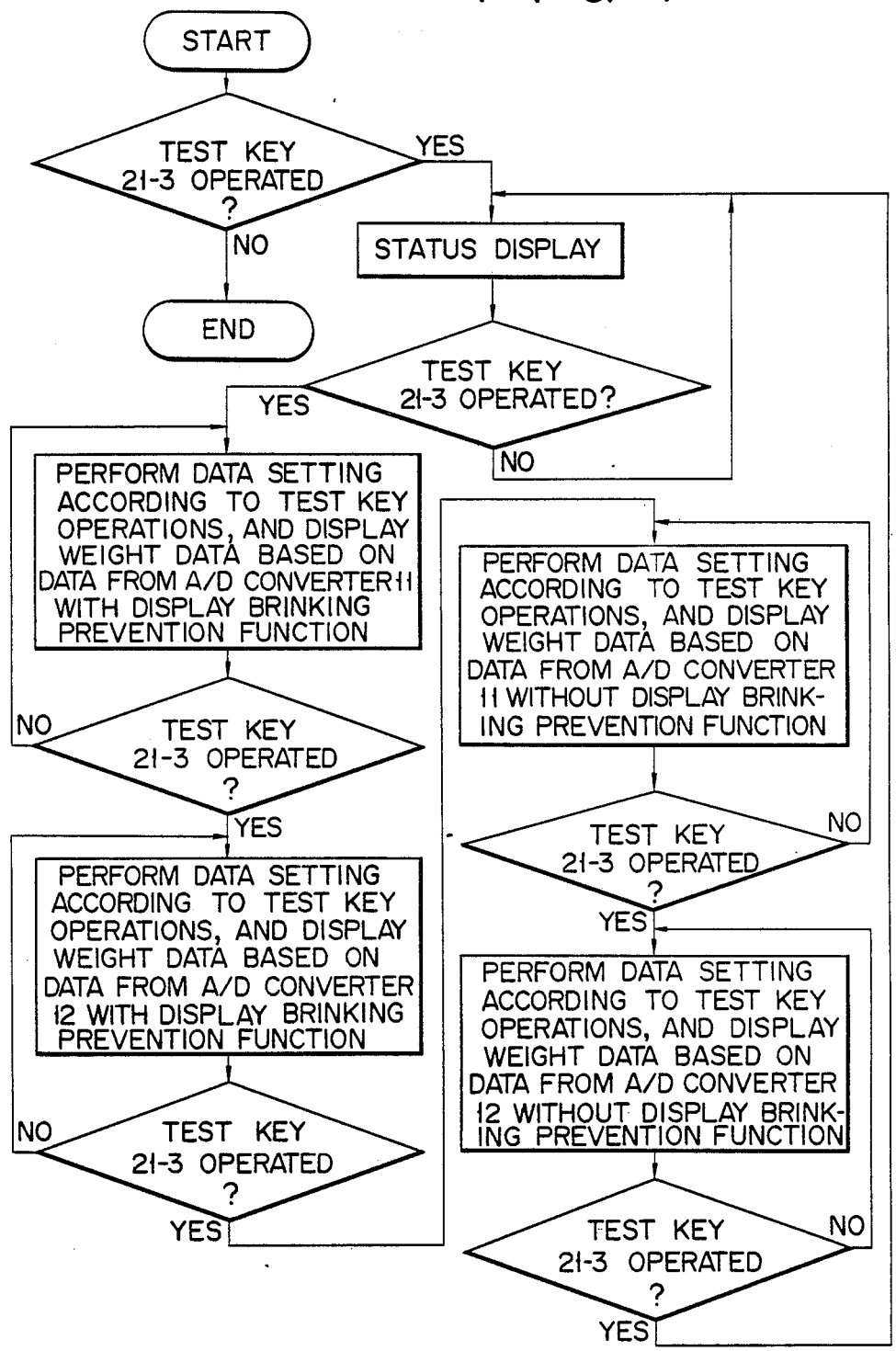
FIG. 4 shows a flow chart explaining the display mode setting operation by CPU used in the multi-load cell scale shown in FIG. 2.

FIG. 4 shows a flow chart explaining the display mode setting operation. When CPU 15 detects that third test key 21-3 has been operated, display device 20 displays the specifications of the scale. When third test key 21-3 is operated again, display device 20 displays the weight data based on the output signal from load cell 4 subjected to the known anti-blinking processing. Subsequently, when third test key 21-3 is operated, the display device 20 displays the weight data based on the output signal from load cell 2 also subjected to the anti-blinking processing. When third key 21-3 is operated again, the display device 20 displays the weight data based on the output signal from load cell 2 which has not been anti-blinking processed. In the flow chart shown in FIG. 4, the data processing operation is performed according to the flow chart shown in FIG. 2, when the display device displays the weight data based on the output signal from load cell 2. This operation is executed no matter whether or not the load cell is anti-blinking processed. Similarly, the data processing operation is performed according to the flow chart shown in FIG. 3, when the weight data based on the output signal from load cell 4 is displayed.

This invention has been described using a preferred embodiment, but is not limited to that embodiment. For example, a couple of load cells placed one on the other may be replaced by a single load cell. Further, in the load cell scale shown in FIG. 1, key 19 may be omitted. In this case, CPU 15 causes display device 20 to display the data WXR stored in memory area MA3 or the data stored in memory area MA4 of RAM 18, without multiplying the data by the coefficient 1, CY or CZ.

Alternatively, in the flow chart shown in FIG. 2 or 3, immediately after the span data WXS or WYS is stored in memory area MAC of RAM 16, 30,000/WXS or 30,000/WYS may be stored in RAM 18.

What is claimed is:

1. A load cell scale comprising:
weight data generating means for generating weight data corresponding to load weight;
said weight data generating means including heavy- and light-range load cells provided one on the other, said load cells producing output signals according to load weight applied thereto, and weight data generating circuit means for converting the output signals from said load cells into weight data;
memory means having first and second memory areas, said memory means including a nonvolatile memory;
first and second keys; and
data processing means including means for storing in response to an operation of said first key the weight data from said weight data generating means, as zero-point data, into the first memory area of said memory means, means for storing in response to an operation of said second key a difference between the zero-point and the weight data from said weight data generating means into the second memory area of said memory means as span data, and means for producing the weight data resulting from multiplication of the weight data from said weight data generating means by a value as obtained by dividing a preset value by the span data.

2. A load cell scale according to claim 1, further comprising a third key for setting a coefficient depending upon the key position thereof, and said data processing means includes means for producing as weighing data the data obtained by multiplication of the weight data by the coefficient selected depending on the key position of said third key.

3. A load cell scale according to claim 1 in which said weight data generating circuit further includes first and second analog/digital converters for respectively converting the output signals from said heavy- and light-range load cells into digital data, and switching means for selectively supplying the output data from said first and second asnalog/digital converters to said data processing means.

4. A load cell scale according to claim 1, in which said light-range load cell is mounted on said heavy-range load cell, and is more sensitive to load weight than said heavy-range load cell.

5. A load cell scale comprising:
weight data generating means including heavy- and light-range load cells provided one on the other, said load cells producing output signals according to load weight applied thereto, and weight data generating circuit means for converting the output signals from said load cells into weight data;
memory means having first and second memory areas;
first and second keys; and
data processing means including means for storing in response to an operation of said first key the weight data from said weight data generating means, as zero-point data, into the first memory area of said memory means, means for storing in response to an operation of said second key a difference between the zero-point data and the weight data from said weight data generating means into the second memory area of said memory means, as span data.

6. A load cell scale according to claim 5, in which said memory means includes a nonvolatile memory.

7. A load cell scale according to claim 5, further comprising a third key for setting a coefficient depending upon the key position thereof, and said data processing means includes means for producing as Weighing data the data obtained by multiplication of the weight data by the coefficient selected depending on the key position of said third key.

8. A load cell scale according to claim 5, in which said weight data generating circuit further includes first and second analog/digital converters for respectively converting the output signals from said heavy- and light-range load cells into digital data, and switching means for selectively supplying the output data from said first and second analog/digital converters to said data processing means.

9. A load cell scale according to claim 5, in which said light-range load cell is mounted on said heavy-range load cell, and is more sensitive to load weight than said heavy-range load cell.

* * * * *